United States Patent
Liao et al.

(10) Patent No.: US 8,594,963 B2
(45) Date of Patent: Nov. 26, 2013

(54) IN-LINE INSPECTION YIELD PREDICTION SYSTEM

(75) Inventors: Hsiang-Chou Liao, Taipei (TW); Che-Lun Hung, Zhudong Township, Hsinchu County (TW); Tuung Luoh, Taipei (TW); Ling-Wuu Yang, Hsinchu (TW); Ta-Hone Yang, Toufen Township, Miaoli County (TW); Kuang-Chao Chen, Taipei (TW)

(73) Assignee: Macronix International Co., Ltd., Hsin-Chu (TW)

( * ) Notice: Subject to any disclaimer, the term of this patent is extended or adjusted under 35 U.S.C. 154(b) by 294 days.

(21) Appl. No.: 12/873,942

(22) Filed: Sep. 1, 2010

(65) Prior Publication Data

US 2012/0053855 A1 Mar. 1, 2012

(51) Int. Cl.
*G06F 19/00* (2011.01)

(52) U.S. Cl.
USPC .......... 702/84; 700/109; 700/110; 716/52; 716/55; 716/56; 716/136; 438/14; 382/144; 382/145

(58) Field of Classification Search
USPC .......... 702/84; 700/109, 110; 716/52, 55, 56; 716/136, 4, 19, 21, 51; 438/14; 382/144, 382/145
See application file for complete search history.

(56) References Cited

U.S. PATENT DOCUMENTS

| | | | |
|---|---|---|---|
| 5,598,341 A | 1/1997 | Ling et al. | |
| 5,917,332 A * | 6/1999 | Chen et al. | 324/750.02 |
| 6,017,771 A | 1/2000 | Yang et al. | |
| 6,694,208 B1 * | 2/2004 | Sheu et al. | 700/121 |
| 6,777,676 B1 * | 8/2004 | Wang et al. | 850/8 |
| 6,947,806 B2 * | 9/2005 | Wang | 700/121 |
| 7,071,011 B2 * | 7/2006 | Lin | 438/5 |
| 7,174,521 B2 * | 2/2007 | Stine et al. | 716/52 |
| 7,280,945 B1 * | 10/2007 | Weiner et al. | 703/2 |
| 7,348,594 B2 * | 3/2008 | Ciplickas et al. | 257/48 |
| 7,356,800 B2 * | 4/2008 | Stine et al. | 716/52 |
| 7,673,262 B2 * | 3/2010 | Stine et al. | 716/136 |
| 7,937,179 B2 * | 5/2011 | Shimshi et al. | 700/110 |
| 7,962,864 B2 * | 6/2011 | Nehmadi et al. | 716/51 |
| 7,975,245 B2 * | 7/2011 | Florence et al. | 716/52 |
| 8,000,519 B1 * | 8/2011 | Zheng et al. | 382/145 |
| 2001/0042705 A1 * | 11/2001 | Nakagaki et al. | 209/44.4 |
| 2002/0027653 A1 * | 3/2002 | Shibata et al. | 356/237.3 |
| 2004/0228515 A1 * | 11/2004 | Okabe et al. | 382/145 |
| 2005/0055121 A1 * | 3/2005 | Wang | 700/110 |
| 2005/0073875 A1 * | 4/2005 | Tohyama | 365/154 |
| 2005/0210423 A1 | 9/2005 | Liao et al. | |
| 2005/0251771 A1 * | 11/2005 | Robles | 716/5 |
| 2007/0114396 A1 * | 5/2007 | Tohyama | 250/307 |
| 2008/0294281 A1 * | 11/2008 | Shimshi et al. | 700/110 |
| 2008/0295047 A1 * | 11/2008 | Nehmadi et al. | 716/4 |
| 2008/0295048 A1 * | 11/2008 | Nehmadi et al. | 716/4 |
| 2009/0299669 A1 * | 12/2009 | Leu et al. | 702/84 |

* cited by examiner

*Primary Examiner* — Carol S Tsai
(74) *Attorney, Agent, or Firm* — Alston & Bird LLP

(57) ABSTRACT

A method of predicting product yield may include determining defect characteristics for a product based at least in part on inspection data associated with critical layers of the product, determining yield loss for each of the critical layers, and estimating product yield based on the determined yield loss of the critical layers. A corresponding apparatus is also provided.

18 Claims, 15 Drawing Sheets

| Lot | Die Count | Layer Step K | Scan Date:Time |
|---|---|---|---|
| 245920 | 2063 | STIADI | 2009/8/22 16:33 |
| 245920 | 2063 | STIAEI | 2009/8/24 10:24 |
| 245920 | 2063 | ST2AEI | 2009/8/25 17:16 |
| 245920 | 2063 | STISNR | 2009/9/2 20:45 |
| 245920 | 2063 | PL1DIR | 2009/9/8 09:45 |
| 245920 | 2063 | PL1AEI | 2009/9/8 21:24 |
| 245920 | 2063 | ONODEP | 2009/9/12 06:55 |
| 245920 | 2063 | PL2ADI | 2009/9/17 12:40 |
| 245920 | 2063 | PL3AEI | 2009/9/19 20:27 |
| 245920 | 2063 | PL2AEI | 2009/9/20 17:12 |
| 245920 | 2063 | SASAEI | 2009/9/22 21:07 |
| 245920 | 2063 | SPRAEI | 2009/9/27 18:09 |
| 245920 | 2063 | RPOAEI | 2009/10/1 22:20 |
| 245920 | 2063 | BAR1-DEP | 2009/10/10 11:52 |
| 245920 | 2063 | ML1AEI | 2009/10/16 08:20 |
| 245920 | 2063 | IMD1-DEP | 2009/10/19 04:21 |
| 245920 | 2063 | BAR2-DEP | 2009/10/22 11:11 |
| 245920 | 2063 | W2-CMP | 2009/10/23 23:58 |
| 245920 | 2063 | ML2AEI | 2009/10/30 14:10 |
| 245920 | 2063 | BAR3-DEP | 2009/11/5 08:42 |
| 245920 | 2063 | W3-CMP | 2009/11/5 18:48 |
| 245920 | 2063 | ML3AEI | 2009/11/7 03:02 |

Exclude Periphery Scan → ST2AEI row
Exclude Periphery Scan → PL3AEI row

FIG. 6.

| Layer | Defect count | Defect Density |
|---|---|---|
| STIADI | 152 | 3.82 |
| STIAEI | 344 | 8.57 |
| STISNR | 360 | 8.66 |
| PL1DIR | 1249 | 25.83 |
| PL1AEI | 1278 | 10.88 |
| ONODEP | 579 | 13.5 |
| PL2ADI | 8419 | 89.4 |
| PL2AEI | 544 | 11.94 |
| SASAEI | 288 | 6.75 |
| SPRAEI | 684 | 11.04 |
| RPOAEI | 1378 | 29.04 |
| BAR1-DEP | 49 | 1.35 |
| ML1AEI | 36 | 1.12 |
| IMD1-DEP | 56 | 0.79 |
| BAR2-DEP | 478 | 2.46 |
| W2-CMP | 30 | 0.33 |
| ML2AEIA | 37 | 0.88 |
| ML2AEIP | 1018 | 1.76 |
| BAR3-DEP | 142 | 4.44 |
| W3-CMP | 7 | 0.23 |
| ML3AEI | 26 | 0.63 |

FIG. 7.

| Layer | Random Defect Count | Review/fail bin false rate |
|---|---|---|
| STI ADI | 112 | 30% |
| STI AEI | 303 | 10% |
| STI SNR | 319 | 24% |
| PL1 DIRECT | 1093 | 75% |
| PL1 AEI | 381 | 62% |
| ONO O2DEP | 487 | 73% |
| PL2 ADI | 8043 | 86% |
| PL2 AEI | 425 | 98% |
| SAS AEI | 226 | 84% |
| SPR AEI | 394 | 90% |
| RPO AEI | 1189 | 88% |
| BAR1 DEP | 41 | 56% |
| ML1 AEI | 36 | 36% |
| IMD1 CAP | 29 | 97% |
| BAR2 DEP | 72 | 50% |
| W2 CMP | 8 | 87% |
| ML2 AEI | 32 | 7% |
| BAR3 DEP | 131 | 35% |
| W3 CMP | 7 | 86% |
| ML3 AEI | 20 | 10% |

FIG. 9.

| Layer | Killer defect rate (Review) |
|---|---|
| STI ADI | 21.00% |
| STI AEI | 24.40% |
| STI SNR | 35.30% |
| PL1 DIRECT | 25.60% |
| PL1 AEI | 17.40% |
| ONO O2DEP | 15.00% |
| PL2 ADI | 0% |
| PL2 AEI | 38.00% |
| SAS AEI | 44.80% |
| SPR AEI | 34.90% |
| RPO AEI | 26.40% |
| BAR1 DEP | 14.30% |
| ML1 AEI | 25.00% |
| IMD1 CAP | 17.90% |
| BAR2 DEP | 17.60% |
| W2 CMP | 0% |
| ML2 AEI | 13.50% |
| BAR3 DEP | 7.70% |
| W3 CMP | 0% |
| ML3 AEI | 7.70% |

FIG. 10.

| A | B | V | W | X | AA | AG | AY | BA | BE | BL | BT |
|---|---|---|---|---|---|---|---|---|---|---|---|
| | Wafer | Pass | Good | Bin2 | Open | IcmsO | InMg1 | InMg0 | StbRd1 | MgCk0 | MgBoRD |
| 1 | 1/* | 24.51 | 5.91 | 18.6 | 0.32 | 1.27 | 10.72 | 0.28 | 34.82 | 4.14 | 0.47 |
| 2 | 2/* | 87.44 | 71.63 | 15.81 | 0.35 | 1.04 | 4.27 | 0.25 | 0.79 | 2.21 | 0.13 |
| 3 | 5/* | 85.42 | 68.41 | 17.01 | 0.76 | 1.74 | 2.85 | 0.44 | 2.15 | 2.81 | 0.09 |
| 4 | 6/* | 84.85 | 64.93 | 19.92 | 0.85 | 1.64 | 4.33 | 0.41 | 1.33 | 2.94 | 0.16 |
| 5 | 13/* | 88.3 | 70.75 | 17.55 | 0.41 | 1.3 | 2.85 | 0.32 | 1.2 | 2.66 | 0.28 |
| 6 | 14/* | 86.69 | 68.28 | 18.41 | 0.6 | 1.01 | 3.45 | 0.25 | 1.04 | 2.34 | 0.03 |
| 7 | 15/* | 82.35 | 50.66 | 31.69 | 0.82 | 1.39 | 5.34 | 0.47 | 1.58 | 2.85 | 0.95 |
| 8 | 18/* | 85.36 | 66.16 | 19.2 | 1.45 | 2.31 | 2.85 | 0.32 | 0.76 | 2.53 | 0.19 |
| 9 | 20/* | 88.43 | 73.66 | 14.77 | 0.51 | 0.98 | 3.48 | 0.35 | 0.82 | 2.47 | 0.13 |
| 10 | 23/* | 83.43 | 60.12 | 23.31 | 1.27 | 1.58 | 4.43 | 0.25 | 1.04 | 2.28 | 1.14 |

| Sort flow | | Order | Root Cause |
|---|---|---|---|
| 1) | 10 Open | 5 | Open |
| 2) | 16 Icm0 | 3 | IC Stand by |
| 3) | 35/37 IMg1/IMg0 | 1 | UV open UV HB Read 1 /UV LB read 0 repair |
| 4) | 40 StdRd1 | 4 | Erase function |
| 5) | 47 MgCk0 | 2 | Program Function |
| 6) | 55 MgB0RD | 6 | Read repair verification |

FIG. 11.

| Layer | Random Defect Count |
|---|---|
| STI ADI | 112 |
| STI AEI | 303 |
| STI SNR | 319 |
| PL1 DIRECT | 1093 |
| PL1 AEI | 381 |
| ONO O2DEP | 487 |
| PL2 ADI | 8043 |
| PL2 AEI | 425 |
| SAS AEI | 226 |
| SPR AEI | 394 |
| RPO AEI | 1189 |
| BAR1 DEP | 41 |
| ML1 AEI | 36 |
| IMD1 CAP | 29 |
| BAR2 DEP | 72 |
| W2 CMP | 8 |
| ML2 AEI | 32 |
| BAR3 DEP | 131 |
| W3 CMP | 7 |
| ML3 AEI | 20 |

FIG. 13.

| Layer | Total Defect Count |
|---|---|
| STI ADI | 78 |
| STI AEI | 272 |
| STI SNR | 242 |
| PL1 DIRECT | 273 |
| PL1 AEI | 145 |
| ONO O2DEP | 130 |
| PL2 ADI | 1110 |
| PL2 AEI | 9 |
| SAS AEI | 36 |
| SPR AEI | 39 |
| RPO AEI | 143 |
| BAR1 DEP | 18 |
| ML1 AEI | 23 |
| IMD1 CAP | 1 |
| BAR2 DEP | 36 |
| W2 CMP | 1 |
| ML2 AEI | 30 |
| BAR3 DEP | 85 |
| W3 CMP | 1 |
| ML3 AEI | 18 |

FIG. 14.

| Layer | Estimate Killer DD | Yield Loss |
|---|---|---|
| STI ADI | 16.46 | 0.52% |
| STI AEI | 66.39 | 2.10% |
| STI SNR | 85.58 | 2.71% |
| PL1 DIRECT | 69.95 | 2.21% |
| PL1 AEI | 25.19 | 0.80% |
| ONO O2DEP | 19.50 | 0.62% |
| PL2 ADI | 0.00 | 0.00% |
| PL2 AEI | 3.23 | 0.10% |
| SAS AEI | 16.20 | 0.51% |
| SPR AEI | 13.75 | 0.43% |
| RPO AEI | 37.67 | 1.19% |
| BAR1 DEP | 2.58 | 0.08% |
| ML1 AEI | 5.75 | 0.18% |
| IMD1 CAP | 0.16 | 0.00% |
| BAR2 DEP | 6.34 | 0.20% |
| W2 CMP | 0.00 | 0.00% |
| ML2 AEI | 4.00 | 0.13% |
| BAR3 DEP | 6.54 | 0.21% |
| W3 CMP | 0.00 | 0.00% |
| ML3 AEI | 1.39 | 0.04% |

FIG. 15.

IN-LINE INSPECTION YIELD PREDICTION SYSTEM

TECHNOLOGICAL FIELD

Embodiments of the present invention relate generally to semiconductor wafer manufacturing and, more particularly, relate to a process for estimating yield loss relating to semiconductor wafer manufacturing.

BACKGROUND

Since the advent of computers, there has been a steady drive toward producing smaller and more capable electronic devices, such as computing devices, communication devices and memory devices. In order to reduce the size of such devices, while maintaining or improving their respective capabilities, the size of components within the devices must be reduced. Several of the components within electronic devices are made from semiconductor materials, which in some cases are provided via a structure called a semiconductor wafer. Semiconductor wafers may be used to produce integrated circuits (ICs) having the performance and size characteristics desirable for a particular component.

Since modern integrated circuits can be manufactured to such small scales, any defects on the ICs may have a relatively large impact. If a defect is of a nature or size that is sufficient to damage semiconductor circuits, the corresponding semiconductor device's performance may be deteriorated. Defects such as contamination particles, which may be produced when a tool malfunctions or there is some other process problem, may cause shorts or otherwise prevent normal operation of the semiconductor device. The impact caused by a particular defect is often directly related to the size and/or location of the defect. Some defects are of such a nature as to essentially "kill" the corresponding wafer by rendering the wafer relatively unusable. These kill defects or killer defects, as they are sometimes called, result in yield loss during the manufacturing process.

Various efforts have been made to determine whether wafers have become contaminated during the manufacturing process including in-line inspection for visual defects. The in-line inspection happens in substantially real time to identify potential wafer defects. However, not all visually perceptible defects are actually killer defects and thus, there could be some inaccuracy associated with the decisions on whether to consider a particular wafer to be killed or failed. Accordingly, some wafers may not be identified as being defective until later, while other wafers may be unnecessarily considered defective. Moreover, in-line monitoring defect types don't always correspond with wafer sort fail bin types when actual data is examined. Thus, it may be difficult to predict what yield to expect, particularly for active or new products.

It may therefore be desirable to provide an improved system that may address some of the shortcoming described above.

BRIEF SUMMARY OF EXEMPLARY EMBODIMENTS

Embodiments of the present invention are therefore provided that may enable the provision of estimates regarding active product/new generation product yield loss. Yield loss rates may therefore be determined with reduced error ranges. Critical killer layers may be determined along with determinations as to critical defect size. Accordingly, for example, defect size and distribution may be used to provide relatively accurate predictions regarding yield models.

In an example embodiment, a method of predicting product yield is provided. The method may include determining defect characteristics for a product based at least in part on inspection data associated with critical layers of the product, determining yield loss for each of the critical layers, and estimating product yield based on the determined yield loss of the critical layers.

In another example embodiment, an apparatus for predicting product yield is provided. The apparatus may include a processor configured to control a yield predictor with respect to determining defect characteristics for a product based at least in part on inspection data associated with critical layers of the product, determining yield loss for each of the critical layers, and estimating product yield based on the determined yield loss of the critical layers.

It is to be understood that the foregoing general description and the following detailed description are exemplary, and are not intended to limit the scope of the invention.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 6 illustrates an example of data extraction according to an example embodiment of the present invention;

FIG. 7 illustrates an example of data indicative of each of various layers and the corresponding defect count and defect density associated with each respective layer according to an example embodiment of the present invention;

FIG. 9 illustrates an example of random defect counts and corresponding fail bin false rates for each respective critical layer according to an example embodiment of the present invention;

FIG. 10 illustrates data showing the kill defect rate for each of a plurality of critical layers according to an example embodiment of the present invention;

FIG. 11 illustrates data that may be used in connection with providing a data comparison according to an example embodiment of the present invention;

FIG. 13 illustrates a chart of data indicating the random defect count for each critical layer according to an example embodiment of the present invention;

FIG. 14 shows an example of total defect counts by critical layer after accounting for the false rate according to an example embodiment of the present invention;

FIG. 15 shows an example chart of yield loss for each critical layer and the corresponding estimated kill defect die number for each respective layer according to an example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements.

Figure 1:
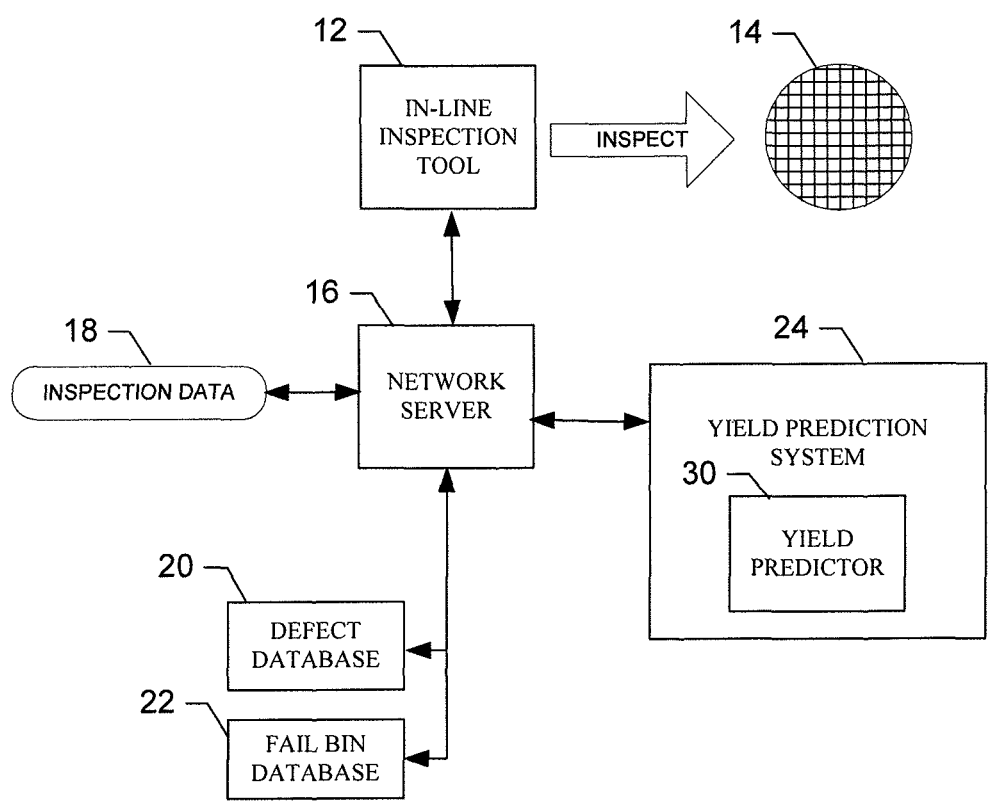
FIG. 1 illustrates an architecture of a system for providing in-line inspection of wafer defects to enable yield prediction according to an example embodiment of the present invention.

Some embodiments of the present invention may provide a mechanism by which improvements may be experienced in relation to the production of semiconductor device wafers. FIG. 1 illustrates an architecture of a system for providing in-line inspection of wafer defects to enable yield prediction. In this regard, as shown in FIG. 1, the system 10 may include an in-line inspection tool 12 which may be configured to inspect or facilitate inspection of each of a plurality of wafers (e.g., wafer 14). The in-line inspection tool 12 may provide information determined thereat to a network server 16, which may be configured to store inspection data 18 gathered at various stages or in association with wafers having various processes applied thereto. The in-line inspection tool 12 may be any in-line inspection tool (or tools) known in the art that is capable of determining the data described herein.

In an example embodiment, the network server 16 may also be in communication with one or more databases storing information regarding defect and failure data (e.g., a defect database 20 and a fail bin database 22, respectively) as part of an advanced process control (APC) network. In some embodiments, the system 10 may include a yield prediction system 24 that may be configured to receive data from other devices in the system 10 via the network server 16. The yield prediction system 24 may be configured to determine an estimate for product yield and perhaps also kill defect size distribution for a product that is currently active or planned for use in the future. The yield prediction system may include a yield predictor 30 according to an example embodiment as described herein. The yield predictor 30 may be configured to predict the product yield based on selected data indicative of defect characteristics associated with various different critical layers of the product. As such, for example, from historical or recently captured data regarding defect characteristics associated with various critical layers, a set of critical layers may be selected based on those that are expected to be included in the product to be evaluated and a prediction of the product yield may be made based on the data regarding the selected set of critical layers.

Figure 2:
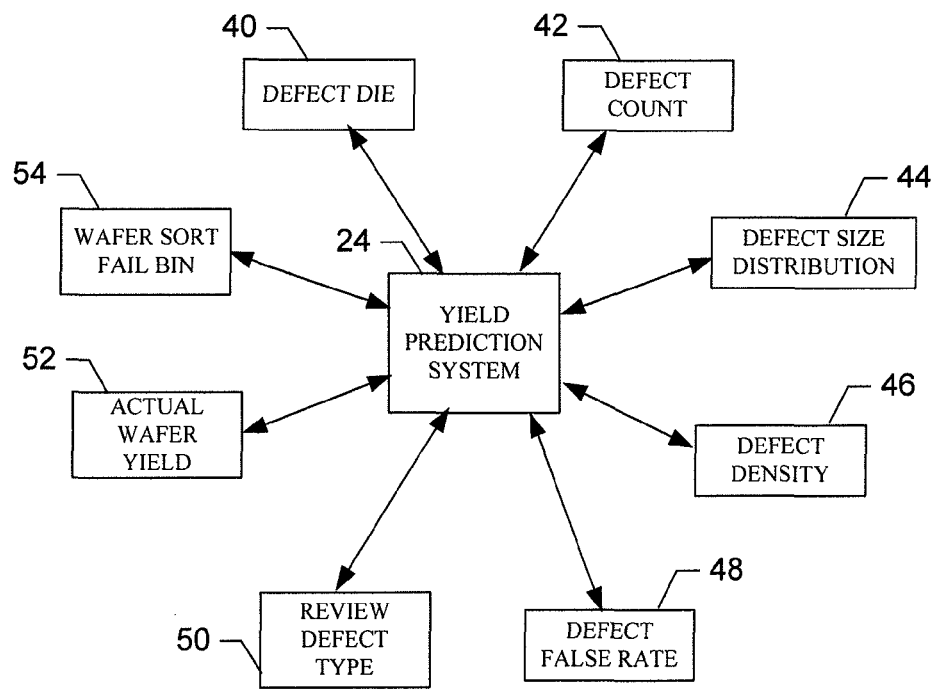
FIG. 2 illustrates various sources of information that may feed data into a yield prediction system according to an example embodiment of the present invention.
Figure 3:
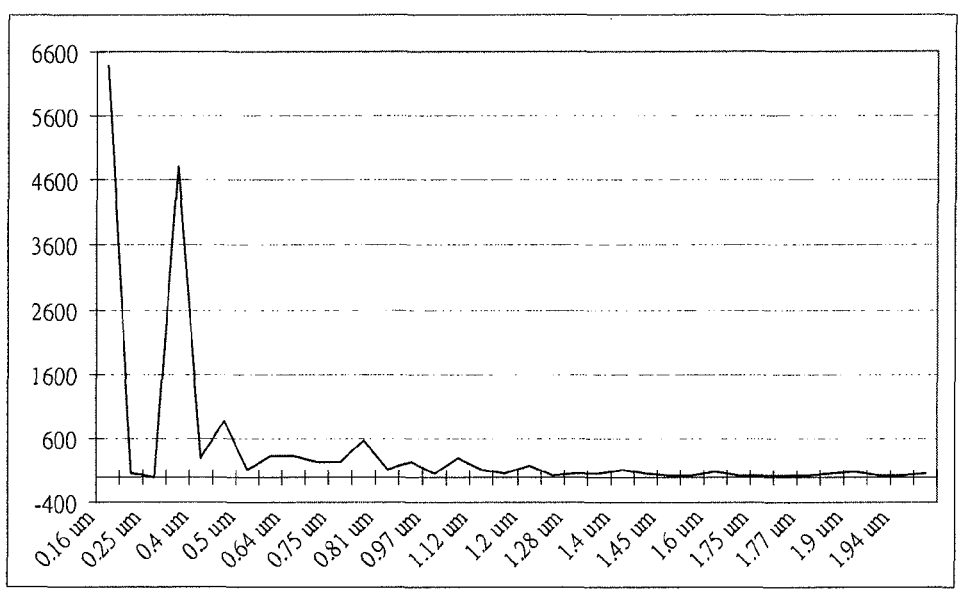
FIG. 3 illustrates an example of defect distribution data that may be received by the yield prediction system according to an example embodiment of the present invention.

The yield prediction system 24 may be configured to receive any of a number of different types of information in order to process the information for yield prediction purposes. FIG. 2 illustrates an example of the various types of information that may feed data into the yield prediction system 24. For example, the yield prediction system 24 may receive data regarding die defects 40, defect count 42, defect size distribution 44, defect density 46, false defect rates 48, review defect type 50, actual wafer yield 52, and wafer sort fail bin 54. FIG. 3 illustrates an example of one type of data that may be received by the yield prediction system 24, namely defect distribution data. As can be seen from FIG. 3, smaller defects are typically more common than larger defects. Information such as this, along with the other data that may be provided to the yield prediction system 24 may be useful in enabling the yield prediction system 24 to accurately predict yield based on in-line inspection data and review of failure data, actual yield and other parameters on a critical layer basis. Thus, based on the critical layers to be employed in a new generation or active product, an estimate of the product yield for the new generation or active product may be determined.

Figure 4:
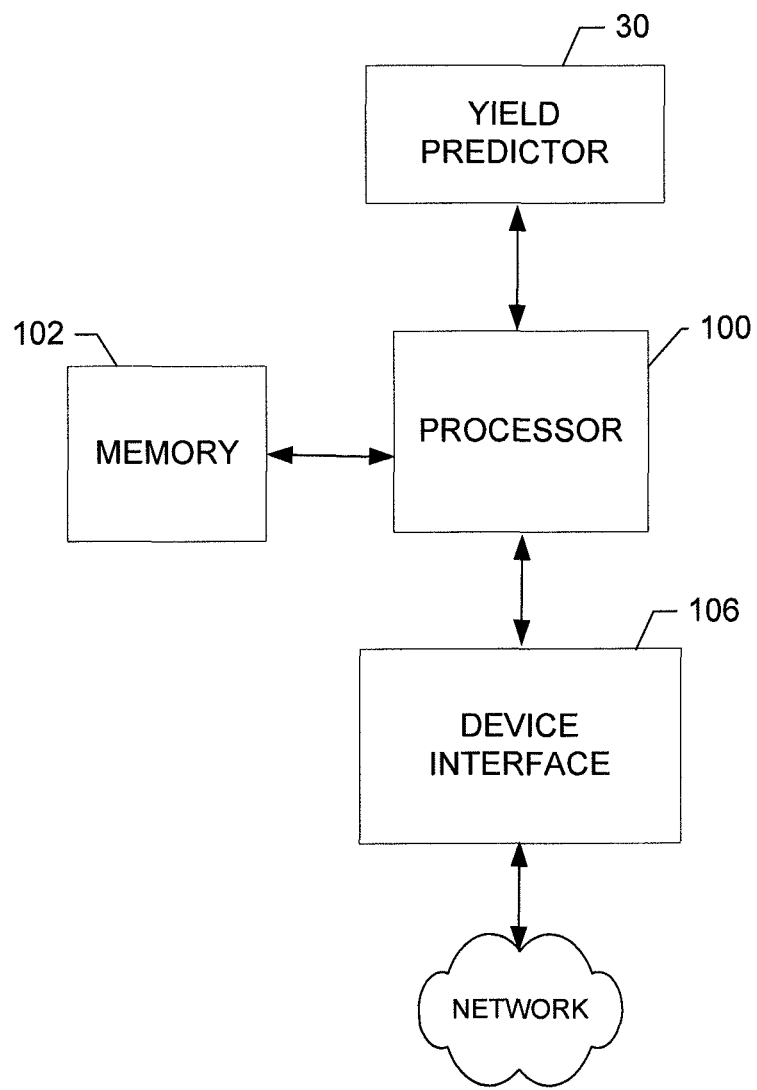
FIG. 4 illustrates a block diagram of an apparatus that may be employed as a portion of the yield prediction system to execute example embodiments of the present invention.

FIG. 4 illustrates a block diagram of an apparatus that may be employed as a portion of the yield prediction system 24 to execute example embodiments of the present invention. As shown in FIG. 4, the apparatus may include or otherwise be in communication with a processor 100, a memory 102, a user interface 104 and a device interface 106. The memory 102 may include, for example, volatile and/or non-volatile memory (i.e., non-transitory storage medium or media) and may be configured to store information, data, applications, instructions or the like for enabling the apparatus to carry out various functions in accordance with exemplary embodiments of the present application. For example, the memory 102 may be configured to buffer input data for processing by the processor 100 and/or store instructions for execution by the processor 100.

The processor 100 may be embodied in a number of different ways. For example, the processor 100 may be embodied as various processing means such as processing circuitry embodied as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 100 may be configured to execute instructions stored in the memory 102 or otherwise accessible to the processor 100. As such, the processor 100 may be configured to cause various functions to be executed either by execution of instructions stored in the memory 102 or by executing other preprogrammed functions.

The user interface 104 may be in communication with the processor 100 to receive an indication of a user input at the user interface 104 and/or to provide an audible, visual, mechanical or other output to the user. As such, the user interface 104 may include, for example, a keyboard, a mouse, a joystick, a display, a touch screen, soft keys, a microphone, a speaker, or other input/output mechanisms.

Meanwhile, the device interface 106 may be any means such as a device or circuitry embodied in either hardware, software, or a combination of hardware and software that is configured to receive and/or transmit data from/to a network and/or any other device or module in communication with the apparatus. In this regard, the device interface 106 may include, for example, an antenna (or multiple antennas) and supporting hardware and/or software for enabling communications with a wireless communication network. In fixed environments, the device interface 106 may alternatively or also support wired communication. As such, the device interface 106 may include a communication modem and/or other hardware/software for supporting communication via cable, digital subscriber line (DSL), universal serial bus (USB) or other mechanisms.

In an example embodiment, the apparatus may further include the yield predictor 30. The yield predictor 30 may be embodied as, included within or otherwise controlled by the processor 100. The yield predictor 30 may be any means such as a device or circuitry embodied in hardware, software or a combination of hardware and software (e.g., processor 100 operating under software control) that is configured to perform the corresponding functions of the yield predictor 30 for estimating the active product/new generation product yield loss, as described below.

Figure 5:
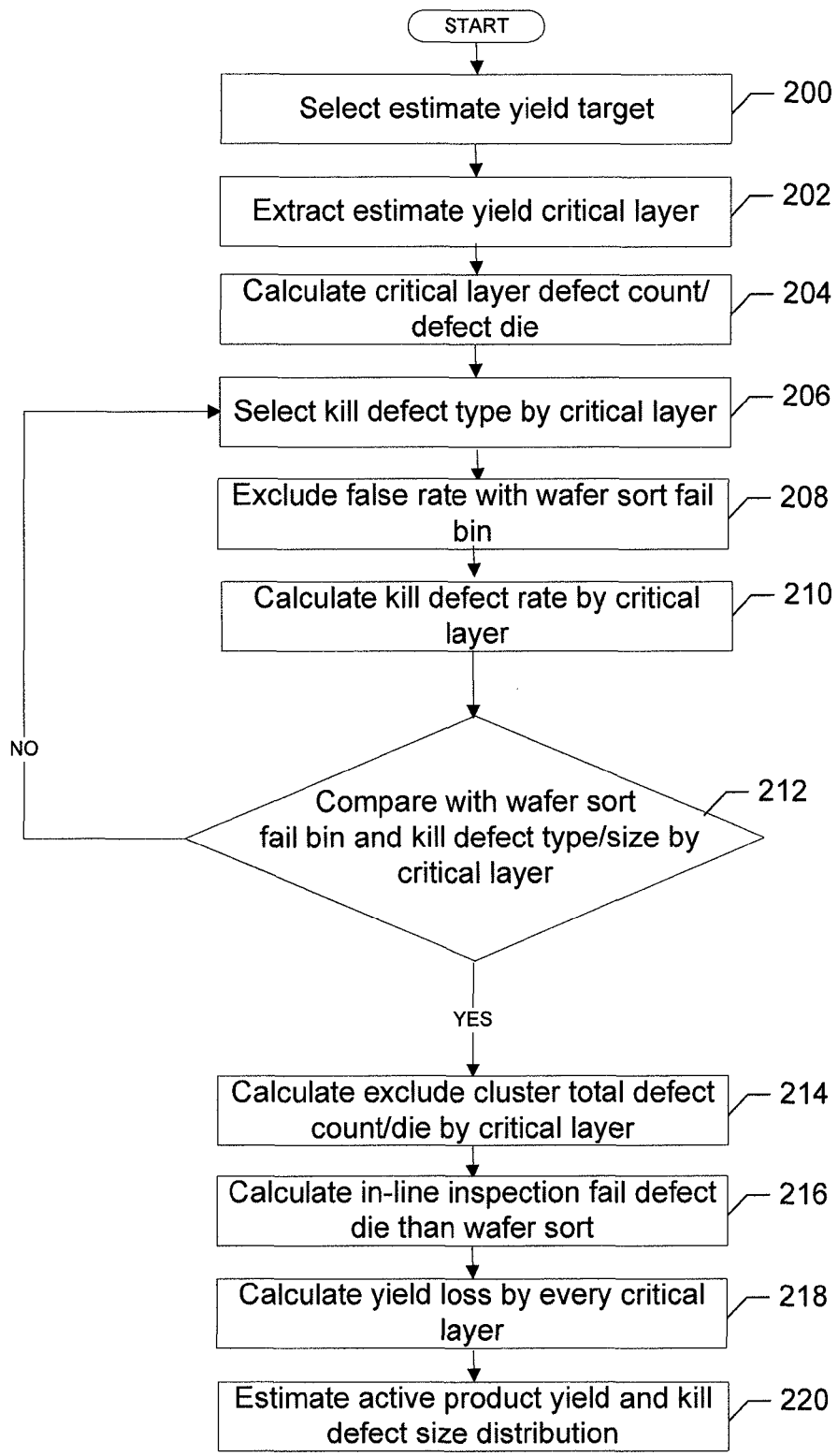
FIG. 5 is a block diagram describing a method for predicting product yield according to an example embodiment of the present invention.
Figure 16:
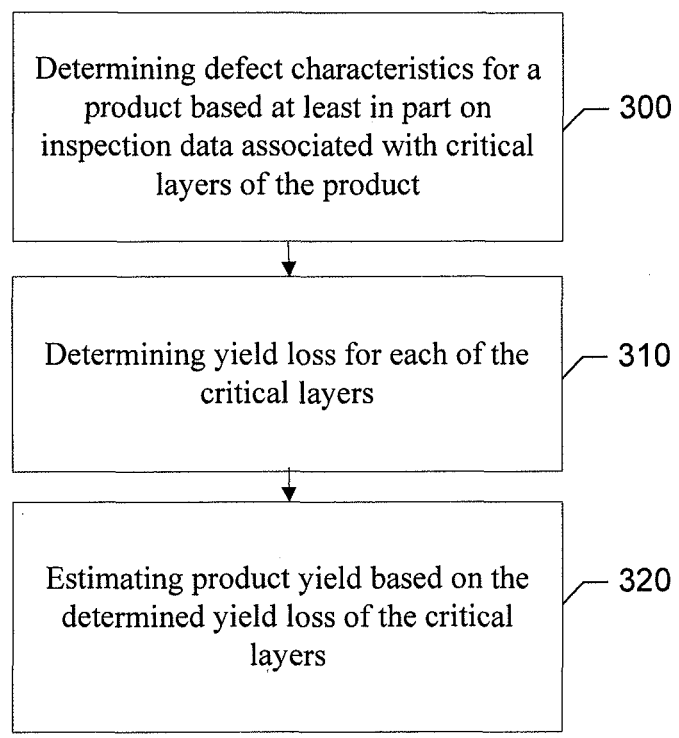
FIG. 16 is a block diagram describing a method for predicting product yield according to an example embodiment of the present invention.

FIGS. 5 and 16 are flowcharts illustrating operations associated with example methods of predicting yield according to an example embodiment. It should be understood that each block of the flowcharts, and combinations of blocks in the flowcharts, can be implemented by various means, such as hardware, firmware, and/or software including one or more computer program instructions. For example, one or more of the procedures described herein may be embodied by computer program instructions. In this regard, the computer program instructions which embody the procedures described above may be stored by a memory and executed by a processor. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s). These computer program instructions may also be stored in a computer-readable electronic storage memory that can direct a computer or other programmable apparatus to function in a particular manner, such that the instructions stored in the computer-readable memory produce an article of manufacture including instruction means which implement the function specified in the flowcharts block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts block(s).

Accordingly, blocks of the flowcharts support combinations of means for performing the specified functions, combinations of operations for performing the specified functions and program instruction means for performing the specified functions. It will also be understood that one or more blocks of the flowcharts, and combinations of blocks in the flowcharts, can be implemented by special purpose hardware-based computer systems which perform the specified functions or operations, or combinations of special purpose, hardware and computer instructions.

As shown in FIG. 5, a method for estimating active product yield according to one example may include selection of an estimate yield target at operation 200. At operation 202, an estimate of the yield critical layers to be employed may be extracted. Thus, for example, if certain layers (e.g., ST2 AEI and PL3 AEI) are not to be included in a particular product, scan data associated with those layers may be excluded from further analysis. FIG. 6 illustrates an example of such an extraction in which data corresponding to a specified lot and die count is provided by layer step identity and corresponding time for each layer except the excluded layers. Individual critical layers may therefore be identified from the data.

Figure 8:
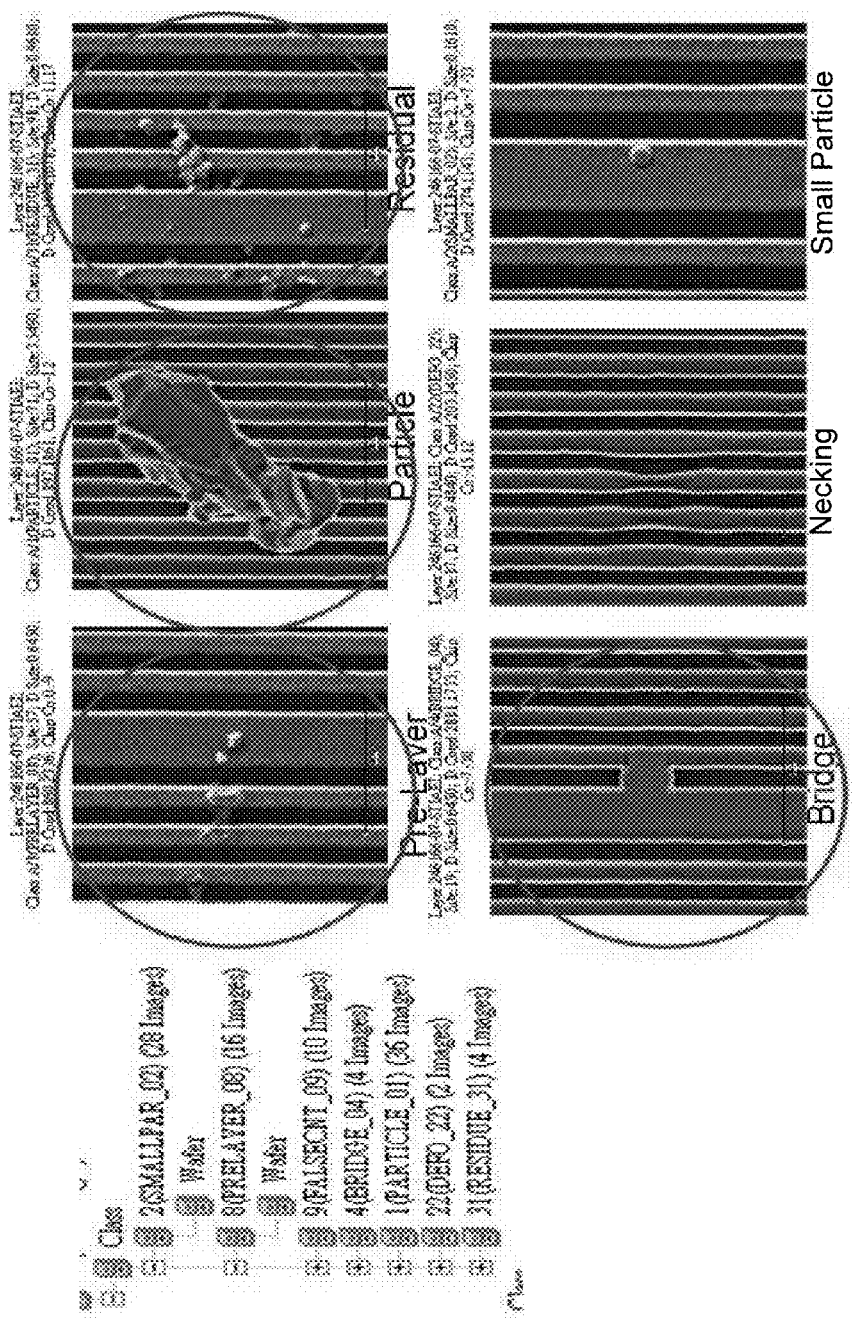
FIG. 8 illustrates an example of a particular layer and images associated with various types of defects that may be expected according to an example embodiment of the present invention.

At operation 204, a calculation may be conducted to determine critical layer defect count/die and/or defect density. FIG. 7 illustrates an example of data indicative of each of various layers and the corresponding defect count ($D_C$) and defect density associated with each respective layer. At operation 206, the kill defect type ($R_K$) may be selected by critical layer. FIG. 8 illustrates an example of a particular layer and images associated with various types of defects that may be expected (e.g., residual, bridge, particle and pre-layer defects). As is also shown in FIG. 8, a plurality of images associated with the killer defects that may be encountered on a critical layer basis may be stored.

Operation 208 may provide for the exclusion of some of the kill defect counts based on the fail bin false rate ($F_B$) for the corresponding critical layer. In other words, a correction to the kill defect count may be accomplished based on review data indicating the likelihood of a false count for the corresponding critical layer. In an example embodiment, the correction may be calculated as $F_B = N_{DC} \div R_{DC}$, where $N_{DC}$ is the non-kill review defect count and $R_{DC}$ is the total review defect count. FIG. 9 illustrates an example of random defect counts and corresponding fail bin false rates for each respective critical layer.

Figure 12:
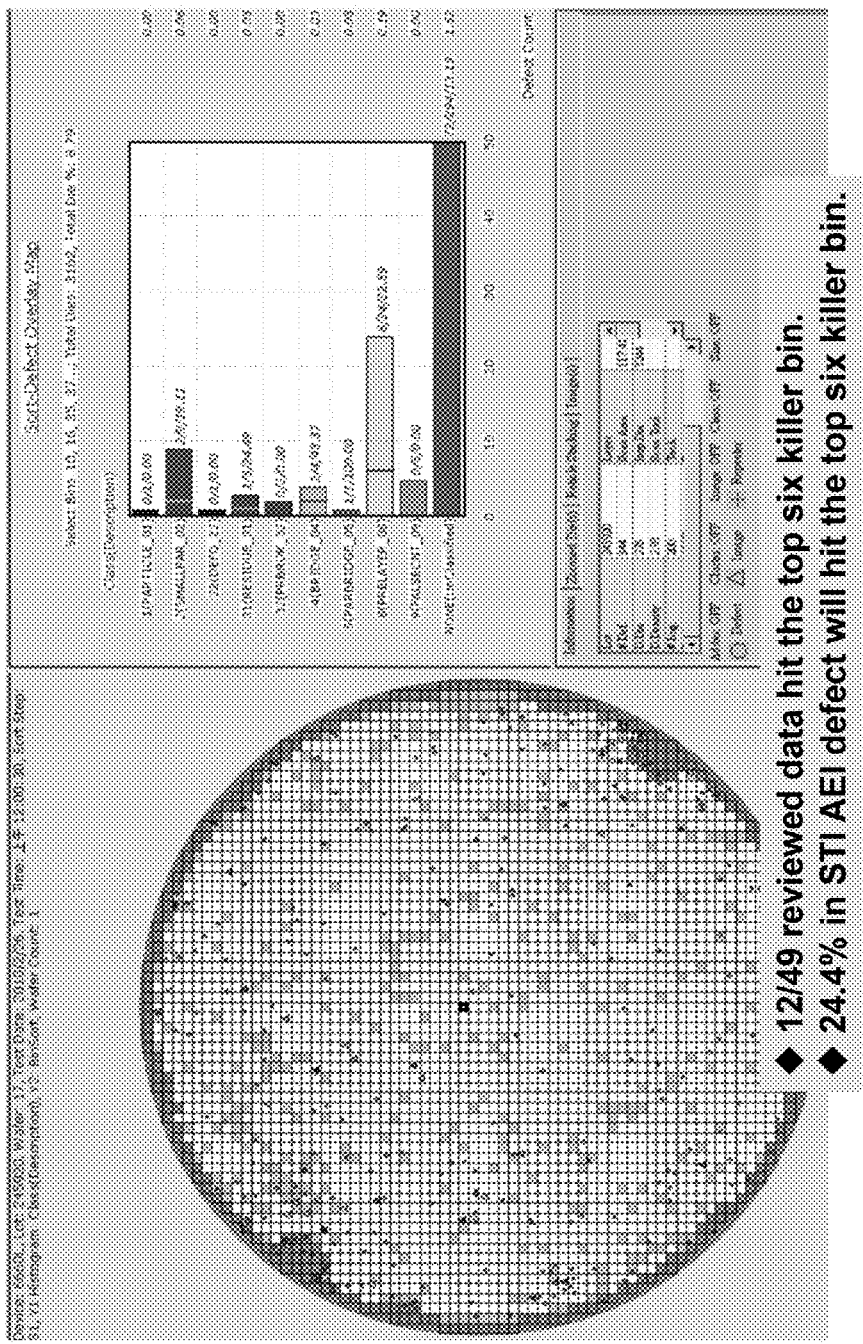
FIG. 12 illustrates an interface screen showing a comparison of failed bin to defect type for a particular critical layer according to an example embodiment of the present invention.

At operation 210, the kill defect rate ($K_R$) may be calculated by critical layer. In some embodiments, the kill defect rate may be calculated as: $K_R = (R_K + D_{CB}) \div D_C$, where $D_{CB}$ represents the review defect count that matches with the wafer sort fail bin. FIG. 10 illustrates an example of data illustrating the kill defect rate for each of a plurality of critical layers. At operation 212, a comparison may be made between the wafer sort fail bin and the kill defect type/size by critical layer. If kill defect types for which there is no match for a given layer, operation may return to operation 206 for the selection of a different kill defect type by critical layer. However, if kill defect types match with the wafer sort fail bin, the method may proceed to operation 214. FIG. 11 illustrates an example of data that may be used in connection with operation 210. FIG. 12 illustrates an example of an interface screen showing a comparison of failed bin to defect type for a particular critical layer (e.g., STI AEI (shallow trench isolation after-develop inspection)). As shown in FIG. 12, twelve of forty-nine reviewed data samples hit the top six killer bin. Accordingly, 24.4% of defects in the STI AEI can be expected to hit the top six killer bin.

At operation 214, a determination may be made to calculate an exclude cluster total defect count (or random defect count ($R_D$)) by critical layer. FIG. 13 illustrates an example chart of data indicating the random defect count for each critical layer. As such, an estimate may be provided by critical layer as to the number of random defects to expect.

At operation 216, an in-line inspection fail defect count may be calculated. In other words, the random defect count and the false rate may be taken into account to get a total defect count ($T_D$) for each respective critical layer as indicated by the equation $T_D = R_D \times F_B$. FIG. 14 shows an example of total defect counts by critical layer after accounting for the false rate. Thereafter, at operation 218, yield loss by every critical layer may be determined. FIG. 15 shows an example chart of yield loss for each critical layer and the corresponding estimated kill defect die number ($E_{KD}$) for each respective layer. The $E_{KD}$ may be determined based on the total defect count $T_D$ and the kill defect rate $K_R$ for each respective layer as indicated by the equation $E_{KD} = T_D \times K_R$. After calculation of the $E_{KD}$, the yield loss ($Y_R$) may be determined by dividing the $E_{KD}$ by the total wafer die number ($W_D$). Thus, $Y_R = E_{KD} \div W_D$. Based on the yield loss for each critical layer, an estimate as to the active product yield for the product may be determined at operation 220. In some embodiments, the product yield may be determined by deducting a summation of the yield losses associated with each critical layer of the active or new generation product.

FIG. 16 illustrates another example of a method for estimating active product yield. As shown in FIG. 16, the method may include determining defect characteristics for a product based at least in part on inspection data associated with critical layers of the product at operation 300, determining yield loss for each of the critical layers at operation 310, and estimating product yield based on the determined yield loss of the critical layers at operation 320.

In some embodiments, the operations above may be modified or amplified as described below. Some or all of the modifications and/or amplifications may be combined in some embodiments. For example, in some cases, determining defect characteristics may include calculating critical layer defect count. In some examples, determining defect characteristics may include selecting a kill defect type by critical layer and calculating a corresponding kill defect rate for each respective critical layer. In an example embodiment, determining defect characteristics may include performing a comparison between wafer sort fail bin data and kill defect type data by critical layer. In some cases, determining defect characteristics may include determining a total defect count by critical layer. In an example embodiment, determining the total defect count may include determining a random defect count by critical layer. In some cases, determining the total defect count may further include modifying the random defect count by a rate of false counts to determine the total defect count. In some examples, the method may further include determining the rate of false counts by dividing a non-kill reviewed defect count by the total reviewed defect count. In an example case, determining yield loss may include dividing a product of the total defect count and a kill defect rate by a total wafer die number.

Accordingly, embodiments of the present invention may enable a relatively accurate prediction to be made for a current or future product as to the estimated product yield that can be expected for the product based on the critical layers that will be included in the product.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of predicting product yield comprising:
   determining defect characteristics for a product based at least in part on inspection data associated with critical layers of the product by at least:
   selecting a kill defect type for each of the critical layers;
   calculating a kill defect rate for the selected kill defect type for each of the critical layers; and
   comparing the kill defect rate with wafer sort fail bin data;
   determining yield loss for each of the critical layers based on the defect characteristics; and
   estimating product yield based on the determined yield loss of the critical layers.

2. The method of claim 1, wherein determining defect characteristics includes calculating critical layer defect count.

3. The method of claim 1, wherein determining defect characteristics includes excluding a portion of defects based on a rate of false positives detected in the wafer sort fail bin.

4. The method of claim 1, wherein determining defect characteristics includes determining a total defect count by critical layer.

5. The method of claim 4, wherein determining the total defect count comprises determining a random defect count by critical layer.

6. The method of claim 5, wherein determining the total defect count further comprises modifying the random defect count by a rate of false positive defect counts to determine the total defect count.

7. The method of claim 6, further comprising determining the rate of false positive defect counts by dividing a non-kill reviewed defect count by the total reviewed defect count.

8. The method of claim 4, wherein determining yield loss comprises dividing a product of the total defect count and a kill defect rate by a total wafer die number.

9. An apparatus comprising a processor configured to control a yield predictor with respect to:
   determining defect characteristics for a product based at least in part on inspection data associated with critical layers of the by at least:
   selecting a kill defect type for each of the critical layers;
   calculating a kill defect rate for the selected kill defect type for each of the critical layers; and
   comparing the kill defect rate with wafer sort fail bin data;
   determining yield loss for each of the critical layers based on the defect characteristics; and
   estimating product yield based on the determined yield loss of the critical layers.

10. The apparatus of claim 9, wherein the processor is configured to control the yield predictor with respect to determining defect characteristics by calculating critical layer defect count.

11. The apparatus of claim 9, wherein the processor is configured to control the yield predictor with respect to determining defect characteristics by excluding a portion of defects based on a rate of false positives detected in the wafer sort fail bin.

12. The apparatus of claim 9, wherein the processor is configured to control the yield predictor with respect to determining defect characteristics by determining a total defect count by critical layer.

13. The apparatus of claim 12, wherein determining the total defect count comprises determining a random defect count by critical layer.

14. The apparatus of claim 13, wherein determining the total defect count further comprises modifying the random defect count by a rate of false positive defect counts to determine the total defect count.

15. The apparatus of claim 14, wherein the processor is further configured to control the yield predictor with respect to determining the rate of false positive defect counts by dividing a non-kill reviewed defect count by the total reviewed defect count.

16. The apparatus of claim 12, wherein the processor is configured to control the yield predictor with respect to determining yield loss by dividing a product of the total defect count and a kill defect rate by a total wafer die number.

17. The method of claim 1, further comprising:
    determining whether the kill defect type is represented in the wafer sort fail bin data; and
    in response to determining that the kill defect type is not represented in the wafer sort fail bin data, selecting another kill defect type and determining the defect characteristics for the product according to the another kill defect type.

18. The apparatus of claim 9, wherein the processor is configured to:
    determine whether the kill defect type is represented in the wafer sort fail bin data; and
    in response to determining that the kill defect type is not represented in the wafer sort fail bin data, select another kill defect type and determine the defect characteristics for the product according to the another kill defect type.

\* \* \* \* \*